United States Patent Office 2,771,115
Patented Nov. 20, 1956

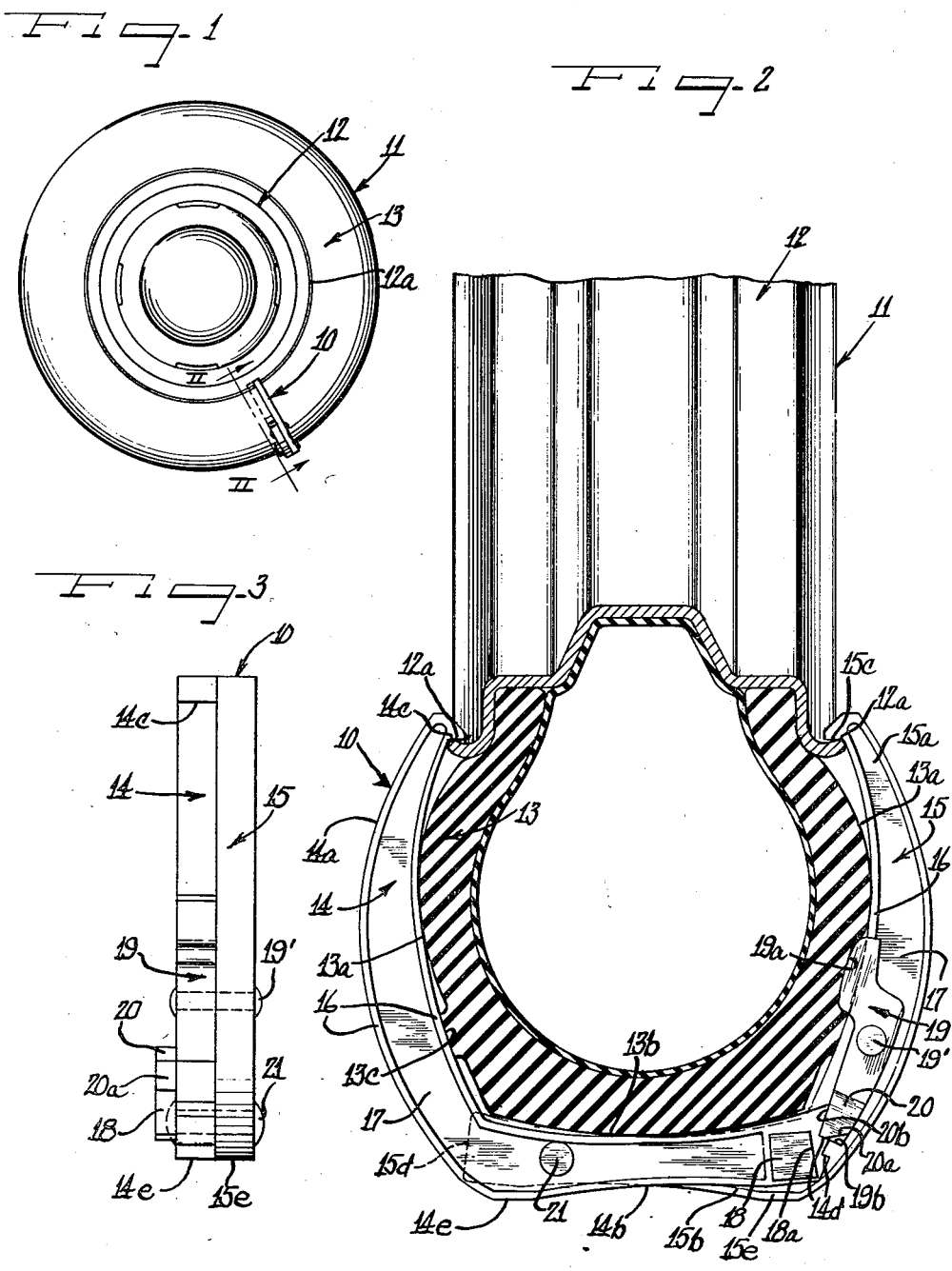

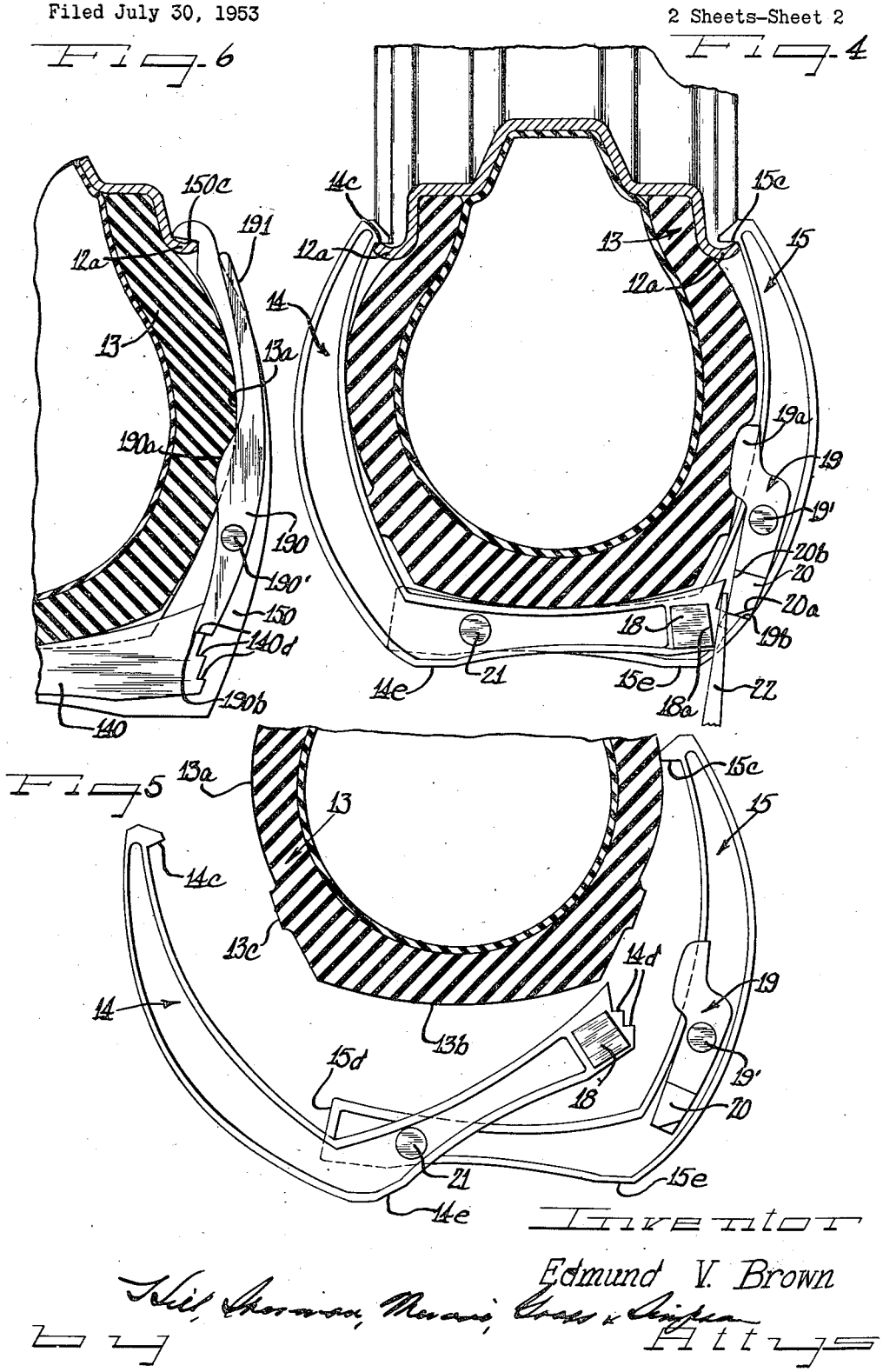

2,771,115
TIRE LUG

Edmund V. Brown, St. Catharines, Ontario, Canada

Application July 30, 1953, Serial No. 371,271

10 Claims. (Cl. 152—228)

This invention relates to a traction clamp for tires and specifically, deals with a tire lug composed of pivoted together clamps fitting around a pneumatic tire and engaging the rim of a wheel on which the tire is mounted together with a locking dog pivotally carried by one of the clamps and engaging the other clamp while held in engaged position by the side wall of the tire.

This application is a continuation-in-part of my copending application Serial No. 60,214, filed November 16, 1948, now Patent No. 2,649,885, entitled: "Tire Lug."

In my aforesaid parent application there is described and claimed a tire lug composed of pivoted together clamp members enveloping an automobile tire and engaging the rim of a wheel on which the tire is mounted. These clamp members have ground engaging knee portions which serve to tighten the clamps on the wheel under the load of the assembly. Various locking devices hold the clamps in tightened position on the wheel and tire. According to the present invention, the clamps are likewise tightened on the wheel and tire by the load of the assembly and in addition, the tire is utilized to hold the locking device in position for retaining the clamps on the wheel. This locking device includes a dog pivoted on one clamp member and having an end for engaging teeth on the other clamp member together with a head for engaging the side wall of the tire to hold the end in engagement with a tooth.

A feature of the present invention is the provision of abutments on the dog and the toothed clamp for receiving a wedging tool such as a screwdriver therebetween to release the dog from the tooth engaged thereby so as to facilitate removal of the clamps from the wheel and tire.

Another feature of the invention resides in the provision of a locking dog on a tire clamp which is automatically closed under the load imparted to the clamp by a tire and wheel assembly or which can be manually moved to locked position by the same type of wedging tool which is used to disengage the dog.

Another feature of the invention resides in the provision of an off center pivot for the clamp members in combination with the projecting knees of my aforesaid parent invention to enhance the tightening of the clamps on the wheel and tire under the load of the assembly.

It is then an object of this invention to provide a device for increasing the traction capacity of a wheel which device is automatically clamped on the wheel under the load of the assembly and is automatically held in clamped relation on the assembly until manually released.

A further object of this invention is to provide a tire clamp for increasing the traction of a tire which is easily applied to a tire and wheel assembly and is automatically clamped in position under the load of the assembly.

A specific object of the invention is to provide a tire clamp which utilizes tire pressure to hold the clamp in locked position on a wheel.

Still another further object of this invention is to provide a tire lug composed of two pivoted together L-shaped clamps having abutment shoulders for engaging the rim of a wheel and each provided with mating locking devices for holding the abutments in position on the rim.

A further and more specific object of the invention is to provide a locking device for a tire lug including a dog member that is held in locked position by the pressure of a tire.

Other and further objects and features of this invention will be apparent to those skilled in the art from the annexed sheets of drawings which, by way of a preferred embodiment of the invention, illustrate one example of the invention.

On the drawings:

Figure 1 is a side elevational view of the outer face of an automobile tire and wheel assembly with the tire lug of this invention affixed thereto.

Figure 2 is an enlarged fragmentary vertical cross-sectional view, with parts in side elevation, taken along the line II—II of Figure 1.

Figure 3 is an end elevational view of the tire lug of this invention.

Figure 4 is a view similar to Figure 2 but illustrating the manner in which the tire lug is removed from the tire and wheel assembly.

Figure 5 is a view similar to Figure 4 but illustrating the manner in which the tire lug is opened relative to the tire for removal or application.

Figure 6 is a fragmentary view, similar to that of Figure 4, but showing a modified form of my invention.

As shown on the drawings:

The tire lug 10 of this invention is mounted on a tire and wheel assembly 11 as shown in Figure 1 to envelop the side walls and the tread portion of the tire. The assembly 11 includes a conventional automobile wheel 12 of the drop center rim type carrying a conventional automobile tire 13. The wheel 12 has the conventional outturned rim flanges or beads 12a and, as illustrated in Figure 2, the tire 13 has the conventional side walls 13a, 13a and tread 13b with raised curb guards or beads 13c, 13c on the side walls 13a adjacent the tread 13b. The tire lug 10 is composed of a pair of L shaped clamp members 14 and 15, each shaped to embrace a side wall 13a and the tread 13b of the tire. These clamps 14 and 15 are preferably composed of light-weight metal such as aluminum and they can be cast or forged. The castings or forgings preferably have inner and outer peripheral ribs 16 and hollowed-out central portions or webs 17 for yielding maximum strength and minimum weight.

The clamp member 14 has a curved side leg 14a conforming with the shape of the side wall of a tire and a substantially horizontal bottom leg 14b shaped to conform with the tread of a tire. The top end of the side leg 14a has an inwardly projecting flange or abutment shoulder 14c for overlying the wheel rim bead 12a. The free end of the horizontal leg 14b has a plurality of ratchet teeth 14d in superimposed stepped relation on the end edge thereof. A ground-engaging knee portion 14e depends from the junction between the side leg 14a and the bottom leg 14b to project beyond the bottom leg. As shown, the bottom face of this bottom leg curves upwardly or is relieved upwardly from the knee 14e.

An abutment lug 18 is affixed to the outer face of the clamp member 14 immediately adjacent the toothed end 14d thereof. This lug 18 has an active side face 18a for a purpose to be more fully hereinafter described.

The clamp member 15 has a side leg 15a similar to the leg 14a and curved to fit around the side wall of a tire together with a substantially horizontal bottom leg 15b shaped to embrace the tread 13b of the tire. An inturned flange or abutment shoulder 15c projects inwardly from the top end of the side leg 15a. The free end 15d of the leg 15b is smooth and is not equipped with teeth. A knee 15e, similar to the knee 14e, is provided at the junction between the side and bottom legs and depends to a level beneath the bottom edge of the main leg portion 15b so as to engage the ground.

A locking dog 19 is pivoted on a pin 19' carried by the side leg 15a above the knee portion 15e thereof. This dog 19 has a head or pad portion 19a adapted to engage the side wall 13a of the tire above the curb guard rim or bead 13b. On the opposite end of the dog there is provided an abutment shoulder or end edge 19b adapted to seat in a tooth 14d and be held therein under the resilient pressure exerted against the head 19a by the tire.

An abutment block 20 is affixed to the outer face of the dog 19 adjacent the end 19b thereof and this block has an inclined active edge 20a coacting with the active edge 18a of the block 18 to provide a wedging groove therebetween.

A pivot pin 21 extending through the leg 14b adjacent the knee 14e and through the leg 15b adjacent the free end edge 15d thereof pivotally connects the clamp members 14 and 15 with the legs 14b and 15b in overlapped relation. The pivot pin 21 is disposed inwardly of the knee 14e toward the toothed end of the leg 14b so that when the knees 14e and 15e engage the ground, the weight of the tire and wheel assembly on the legs 14b and 15b will automatically swing the abutment ends 14c and 15c of the clamp members toward each other to hug the side wall of the tire and overlie the wheel rim beads 12a. The head or pad 19a of the dog 19 will thereupon be acted on by the side wall of the tire to swing the dog into engagement with a tooth 14d. The lug will, therefore, automatically clamp itself around the tire on the wheel.

It should be noted that the end 19b of the dog 19 is adapted to engage any one of the teeth 14d and to move from a lower to a higher tooth as the clamps are moved inwardly to hug the tire. A ratchet lock arrangement is thereby provided which automatically seeks the tightest locking position. As shown in Figure 4, the lug 10 is easily removed from the tire and wheel assembly by inserting a screw driver or other wedging tool 22 into the gap between the abutment blocks 18 and 20. The screwdriver is then swung to pry the end face 19b of the dog 19 out of the tooth 14d engaged thereby and this swinging of the dog will be accommodated by the resilient nature of the side wall of the tire which permits the head 19a to move inwardly against the tire pressure. As shown in Figure 4, the wedge or prying tool 22 is merely fulcrumed against the active face 18a of the block 18 and against the inner edge 20b of the lug or block 20. The inclined edge 20a of this lug guides the tool into the gap between the blocks 18 and 20 and is also effective to force the dog into locked position in a tooth by swinging the prying tool in the opposite direction so as to cam against the edge 20a and force the dog inwardly into a tooth 14d.

As shown in Figure 5, when the dog is released from the tooth, the clamp members 14 and 15 can be spread apart and easily removed from the tire and wheel assembly. The positioning of the pivot 21 near the free end of the bottom leg of one clamp and adjacent the knee junction of the other clamp accommodates opening up of a large gap between the clamp members to facilitate application and removal of the assembly.

To install the tire lug of this invention on a tire and wheel assembly, it is only necessary to hook the abutment edge 14c of the clamp member 14 on the inner rim bead 12a of the wheel and to swing the clamp 15 over the outer side wall of the tire for positioning the abutment edge 15c over the outer wheel bead 12a. This will bring the pad 19a of the dog 19 against the outer side wall of the tire whereupon the dog end 19b will engage a tooth 14d. Then, when the wheel is rotated to engage the knees 14e and 15e with the ground, the weight of the tire and wheel assembly will automatically swing the clamps 14 and 15 closer together to tightly hug the tire. At the same time, if enough looseness is present in the assembly to accommodate movement of the toothed end of the clamp leg 14b and the end of the end 19b of the dog 19 to a position for engaging a tooth closer to the inner face of the clamp 14, the dog will automatically seat in this tooth with a ratchet-like action to lock the clamp members in their tightened position. It is thus seen that the tire lug of this invention automatically tightens itself on a tire and wheel assembly. If manual tightening is desired, however, the prying tool 22, illustrated in Figure 4, is inserted into the gap between the blocks 18 and 20 and is raised against the edge 20a for camming the dog into a tooth 14d.

When it is desired to remove the tire lug from the wheel and tire assembly, the prying tool 22 is inserted into the gap between the blocks 18 and 20 and is swung to force the dog out of engagement with the tooth 14d. The clamp members are then swingable into a wide-open position where they can easily be removed from the tire.

With a view to obviating the need to use a prying tool, as described, I have modified the clamp members 14 and 15 by omitting the cooperating blocks 18 and 20 and by changing the form of the dog 19. Such modified form of my invention is shown in Figure 6, in which the clamp members 140 and 150 correspond functionally and are generally similar to the clamp members 14 and 15 respectively. The clamp member 140 is formed at its free, generally horizontal end with ratchet teeth 140d for engagement by the lower end face 190b of a dog 190. The dog 190 is pivoted, as at 190', to the clamp member 150, and is formed with a pad portion 190a adapted to engage the side wall 13a of the tire. Unlike the dog 19, however, the dog 190 has an extended upper end 191 which is tapered upwardly to lie in spaced generally conforming relation to the upper portion of the tire side wall 13a and thus facilitate its manipulation to disengage the dog end 190b from engagement with the ratchet teeth 140d. This is accomplished quite simply by pushing the upper end 191 toward the tire, with the pad portion 190a acting as a fulcrum, to thereby move the lower dog end 190b outwardly and out of engagement with the ratchet tooth with which it had previously been engaged. Except for eliminating the need for using a prying tool, the structure illustrated in Figure 6 is similar in structure and in its manner of operation to the form of the invention shown in the other figures of the drawings.

In the form of construction shown in Figure 6, the upper end 191 is sufficiently long and sufficiently spaced from the side wall of the tire to enable an operator to grasp the end 191 manually and easily apply the necessary leverage about the fulcrum point, afforded by the pad 190a against the tire wall, to release the dog end 190b from the tooth with which it was engaged. In the act of reengaging the dog with one of the ratchet teeth, the operation is exactly as described for the device of Figures 1 to 5. Thus, no tools at all are necessary either in applying or in removing the device of Figure 6.

It will, of course, be understood that various details of the invention may be varied through a wide range without departing from the principles of this invention, and it is, therefore, not the purpose to limit the patent granted hereon otherwise than necessitated by the scope of the appended claims.

I claim as my invention:

1. A traction lug for a tire and wheel rim assembly which comprises a pair of L-shaped clamp members each having a curved upright leg adapted to embrace the side wall of a tire and a bottom leg adapted to underlie the tread of a tire, said upright legs having abutment shoulders extending inwardly therefrom for overlying a wheel rim, a pivot connecting said clamp members adjacent the free end of the bottom leg portion of one clamp member and at the junction between the side and bottom legs of the other clamp member, said clamp members having depending knee portions at the junctions between their side and bottom legs thereof to provide ground engaging abutments projecting outwardly from the bottom legs, one of said clamp members having ratchet teeth on the free end thereof, the other of said clamp members having a dog pivoted on the side leg thereof adapted to engage said ratchet teeth, and said dog having a head portion adapted to be engaged by the side wall of a tire to hold the dog in one of said teeth whereby the weight of a tire and wheel rim assembly on said knees will urge the abutment shoulders of the clamp members toward each other over the wheel rim and the side wall of the tire will automatically urge the dog into locking position to hold the clamp members tightly around the tire on the wheel rim.

2. A traction lug which comprises pivoted together clamp members adapted to embrace the side walls and tread of a tire, said clamp members having inturned abutment shoulders for overlying the rim of a wheel, a dog pivoted on one clamp member, teeth on the other clamp member engaged by said dog, and a tire engaging portion on said dog effective to swing the dog into locked position in one of said teeth.

3. A tire lug which comprises a pair of pivoted together L-shaped members having hook-like ends adapted to overlie and engage the rim of a wheel, a dog on one member acted on by the side wall of a wheel structure embraced by the lug, ratchet teeth on the other member adapted to be engaged by said dog, and opposed pry blocks on the dog and toothed member facilitating disengagement of the dog from one of said teeth.

4. A traction lug for a wheel rim and tire assembly of the type having a wheel rim with outturned rim flanges and a tire with side walls and a tread which comprises jaws curved to conform snugly to the transverse contour of the tire each including an abutment shoulder for engaging a wheel rim flange, a side leg for overlying the side wall of a tire and a bottom leg for overlying the tread of the tire, a pin connecting said jaws together adjacent the free end of the bottom leg of one jaw and adjacent the junction between the side and bottom legs of the other jaw, ratchet teeth on the bottom leg of one jaw, a dog pivoted on the side leg of the other jaw having an active end portion adapted to engage the ratchet teeth, and a pad on said dog urged by the side wall of the tire to swing the dog into locked position with one of said ratchet teeth.

5. A traction lug comprising a pair of L-shaped members each having a side leg curved to conform with the side wall of a tire and an inturned abutment surface adapted to engage the rim of a wheel, said L-shaped members having overlapped bottom legs adapted to span the tread of a tire, a pivot connecting said bottom legs in overlapped relation, and a dog and ratchet on adjacent portions of said members for locking the members against movement to spread the abutment surfaces apart while permitting movement of the abutment surfaces toward each other, said ratchet having more than one tooth in order to effect different degrees of locking engagement.

6. A traction lug for disposal around a vehicle tire, which comprises jaws, each having a portion conforming to the tire side wall, a tire tread engaging portion and a knee, said tread engaging portion being relieved inwardly from said knee, pivot means joining said tread engaging portions, whereby in clamped position said jaws will be tightened upon said tire by downward force upon said tread portions and upward reactions upon said knees, and locking means pivoted on one of said jaws for acting against the other of said jaws to hold the jaws in locked relation around the vehicle tire, said locking means including a dog pivoted on one jaw, teeth on the other jaw engaged by said dog, and a tire-engaging portion on said dog effective to swing the dog into locked position in one of said teeth.

7. A traction lug for disposal around a vehicle tire, which comprises jaws, each having a portion conforming to the tire side wall, a tire tread engaging portion and a knee, said tread engaging portion being relieved inwardly from said knee, pivot means joining said tread engaging portions, whereby in clamped position said jaws will be tightened upon said tire by downward force upon said tread portions and upward reactions upon said knees, and locking means pivoted on one of said jaws for acting against the other of said jaws to hold the jaws in locked relation around the vehicle tire, said locking means including a dog on one jaw acted on by the side wall of a wheel structure embraced by the jaws, ratchet teeth on the other jaw engageable by said dog, and opposed pry blocks on the dog and toothed jaw facilitating disengagement of the dog from one of said teeth.

8. A traction lug for disposal around a vehicle tire, which comprises jaws, each having a portion conforming to the tire side wall, a tire tread engaging portion and a knee, said tread engaging portion being relieved inwardly from said knee, pivot means joining said tread engaging portions, whereby in clamped position said jaws will be tightened upon said tire by downward force upon said tread portions and upward reactions upon said knees, and locking means pivoted on one of said jaws for acting against the other of said jaws to hold the jaws in locked relation around the vehicle tire, said locking means including a tooth-like portion on one of said jaws, and a dog pivoted intermediate its radially inner and outer ends to the other jaw, said outer end being capable of locking engagement with said tooth-like portion and said inner end having a tire-engaging portion effective to swing said outer end into tooth-engaging locked position and having an inner free end for manual operation to release said outer end from such tooth-engaging locked position.

9. A traction lug for a wheel including a rim and tire thereon, said lug comprising pivoted clamp members having portions adapted to engage the rim and other portions conforming generally to a tire and tread outline in cross-section, one of said clamp members having a tooth-like portion, and a dog pivoted intermediate its radially inner and outer ends to the other of said clamp members, said outer end being adapted for locking engagement with said tooth-like portion and said inner end having a headed portion offset from the jaw depressible into the side wall of a tire upon the exertion of upward reactions upon said members effective to swing said outer end into tooth-engaging locked position and having a free end for manual operation to release said outer end from such tooth-engaging position.

10. A tire lug which comprises a pair of pivoted together L-shaped members having hook-like ends adapted to overlie and engage the rim of a wheel, a dog on one member acted on by the side wall of a wheel structure embraced by the lug, ratchet teeth on the other member adapted to be engaged by said dog, and a free end on the dog facilitating manual disengagement of the dog from one of said teeth.

References Cited in the file of this patent

UNITED STATES PATENTS

| | | |
|---|---|---|
| 1,256,729 | Reese | Feb. 19, 1918 |
| 1,500,409 | Melton | July 8, 1924 |
| 1,800,877 | Vosburgh | Apr. 14, 1931 |
| 2,447,357 | Mosley | Aug. 17, 1948 |

FOREIGN PATENTS

| | | |
|---|---|---|
| 481,280 | Canada | Feb. 28, 1952 |